(12) United States Patent
Wyatt et al.

(10) Patent No.: US 7,025,126 B1
(45) Date of Patent: Apr. 11, 2006

(54) CONDUIT ASSEMBLY FOR FLUID TRANSFER

(75) Inventors: David L. Wyatt, Lenox, MI (US);
Myles E. Davis, Milford, MI (US);
Terry R. Caverly, Waterford, MI (US);
Diego G. Myers, Rochester Hills, MI (US); Steve Hoff, Rochester, MI (US);
Barry Kerska, Rochester, MI (US);
Frank J. Zawodny, Lapeer, MI (US)

(73) Assignee: Dana Corporation, Toledo, OH (US)

( * ) Notice: Subject to any disclaimer, the term of this patent is extended or adjusted under 35 U.S.C. 154(b) by 269 days.

(21) Appl. No.: 10/610,483

(22) Filed: Jun. 30, 2003

(51) Int. Cl.
*F28D 7/10* (2006.01)

(52) U.S. Cl. ...................... 165/154; 165/155

(58) Field of Classification Search ................ 165/154, 165/155, 916
See application file for complete search history.

(56) References Cited

U.S. PATENT DOCUMENTS

| | | | | |
|---|---|---|---|---|
| 2,041,328 A | * | 5/1936 | Forbes | 165/70 |
| 2,047,757 A | * | 7/1936 | Welch | 165/154 |
| 2,085,677 A | * | 6/1937 | Thayer | 165/72 |
| 2,712,438 A | * | 7/1955 | Brown, Jr. | 165/154 |
| 3,145,545 A | * | 8/1964 | Jaeger | 62/323.4 |
| 3,482,626 A | | 12/1969 | Gainsboro et al. | |
| 3,848,607 A | | 11/1974 | St. Clair | |
| 4,231,228 A | * | 11/1980 | Galvin et al. | 62/77 |
| 5,097,898 A | * | 3/1992 | Verkaart | 165/154 |
| 5,433,252 A | * | 7/1995 | Wolf et al. | 138/113 |
| 5,449,113 A | | 9/1995 | Bruckelmyer | |
| 6,145,545 A | | 11/2000 | Hartnagel et al. | |
| 6,390,137 B1 | | 5/2002 | Ewald et al. | |

* cited by examiner

*Primary Examiner*—Teresa J. Walberg
(74) *Attorney, Agent, or Firm*—Rader, Fishman & Grauer PLLC

(57) ABSTRACT

A conduit assembly for transferring heated fluid from a pump to a heat exchanger and to return cooled fluid from the heat exchanger to the pump is disclosed. The conduit assembly includes a flexible inner conduit disposed within a relatively rigid conduit. The heated fluid travels through the flexible inner conduit from the pump to the heat exchanger and the cooled fluid returns to the pump in the space between the outer diameter of the flexible inner conduit and the inner diameter of the rigid conduit. The conduit assembly includes a fluid splitter nipple and a fluid splitter body to split the incoming and outgoing fluid into the inner and outer conduits. The relatively warmer fluid from the pump is exposed to the temperature of the fluid passing simultaneously through the outer conduit, rather than being exposed to the ambient environmental conditions as in conventional hoses. This Abstract is submitted with the understanding that it will not be used to interpret or limit the scope or meaning of the claims.

12 Claims, 6 Drawing Sheets

CONDUIT ASSEMBLY FOR FLUID TRANSFER

TECHNICAL FIELD

The present invention relates generally to fluid transfer assemblies and, in particular, to a fluid transfer assembly including a flexible conduit disposed within a relatively rigid conduit for transferring fluid to and from a heat exchanger, such as a heater circuit in a motor vehicle.

BACKGROUND OF THE INVENTION

A conventional automobile heating system uses an engine housing including a cylinder block, a cylinder head and the like. A main heat receiving chamber is formed in the cylinder head and the associated portions. The main heat receiving chamber is fluidly connected to a radiator and a heater core by a conduit which is opened and closed by a thermostat device. Cooling water is circulated through the main heat receiving chamber, liquid conduits, the radiator and the heater core by a water pump.

The cooling water removes heat from the operating engine to cool the latter, and is in turn heated. The heat of the cooling water is then supplied to the heater core to warm the interior of an automotive body, e.g., a passenger cabin. When the cooling water is excessively heated by the heat of the engine, the thermostat opens the conduit to deliver the cooling water to the radiator for cooling.

Referring now to FIG. 7, there is shown a conventional heating/cooling system 100 for an internal combustion engine 112. The heating/cooling system 100 includes a radiator 114 through which coolant is pumped by a water pump 116 which pumps coolant fluid through the engine and into the radiator 114 by an inlet 118 that is connected to the block of the engine 112 by a hose 120. Coolant is cooled by a core 122 of the radiator 114 before being returned to the engine 112 by a hose 124 that is connected to an outlet 126 of the radiator 114. A filter element 132 is typically disposed between the core 122 and an outlet header tank 130. Also associated with the heating/cooling system 100 is a heater system in the form of a heater core or heater exchanger 134 that has an inlet hose 136 connected to the block 113 of the engine 112. A separate return hose 138 connects the heater core 134 to the water pump 116.

One problem associated with conventional heater systems is that two separate hoses are required for transporting fluid from the pump to the heater core or heat exchanger, and from the heater core back to the pump. In this type of conventional design, both the inlet hose and the return hose are exposed to ambient environmental conditions, such as temperature, humidity, or the like. As a result, the thermal efficiency of the heater system may be compromised because of such exposure to the ambient environmental conditions.

SUMMARY OF THE INVENTION

The inventors of the present invention have recognized these and other problems associated with conventional heater assemblies. To this end, the inventors have developed a conduit assembly that utilizes a fluid splitter that allows fluid to travel in both directions within an inner conduit disposed within an outer conduit. This design allows the inner conduit that supplies the fluid to a heat exchanger to be surrounded with heated fluid, instead of being exposed to the ambient environment conditions as in conventional heater systems.

In the invention, the fluid flowing from the pump is attached to a fluid splitter that has been designed to direct fluid to pass through the inside diameter of the fluid transfer assembly. The opposing end of the fluid splitter connects to the inner conduit disposed within an outer conduit. The fluid within the inner conduit flows into a heat exchanger, such as a heater core, by passing through another fluid splitter connected to the heat exchanger. The fluid that flows from the heat exchanger passes through the fluid splitter and is directed into the outer conduit. Thus, the relatively warmer fluid passing through the inner conduit is exposed to the temperature of the fluid passing simultaneously through the outer conduit back to the pump for another cycle, rather than being exposed to the ambient environmental conditions as in conventional heater assemblies, thereby improving the thermal efficiency of the fluid system.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
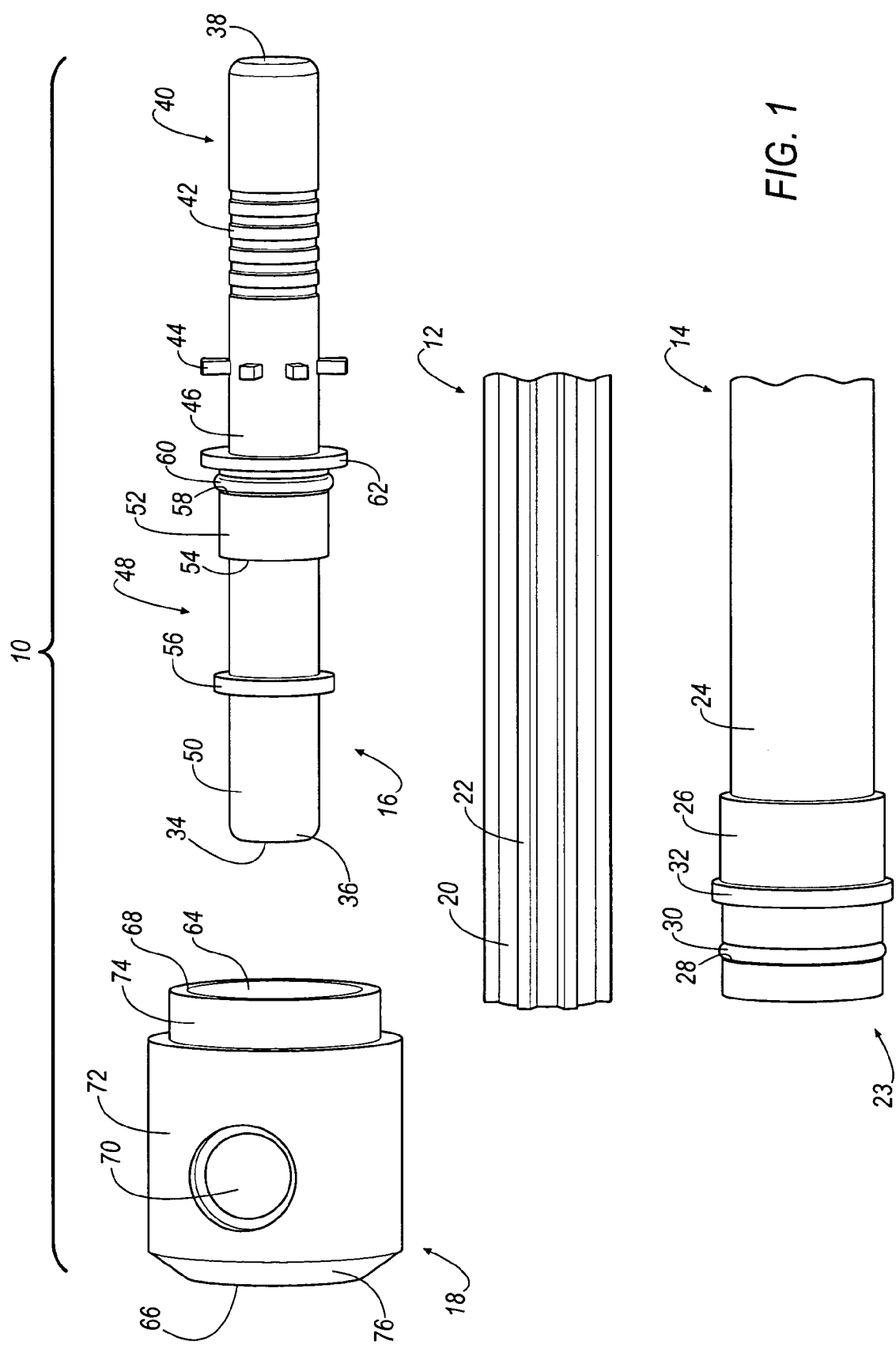
FIG. 1 is a side view of a conduit assembly for transferring fluid showing the various components when the conduit assembly is disassembled.

Referring now to FIGS. 1–4, a conduit assembly 10 for transferring fluid is shown according to an embodiment of the invention. The conduit assembly 10 includes an inner conduit 12, an outer conduit 14, and a fluid splitter nipple 16 and a fluid splitter body 18. The conduit assembly 10 is adapted to be attached to the pump 116 and the heater core 134 of a conventional heater system, such as the heater system 100 described above.

The inner conduit 12 extends longitudinally to supply fluid, such as water, from the pump 116 to a heat exchanger 134, such as a heater core, or the like. The inner conduit 12 includes a generally annular body 20 with a generally circular cross-sectional shape. The inner conduit 12 may include a plurality of ribs 22 extending radially outwardly and longitudinally from the body 20 for locating or centering the inner conduit 12 relative to the outer conduit 14 such that the inner conduit 12 is substantially concentric with the outer conduit 14. In addition, the ribs 22 divide the interior of the outer conduit 14 into a plurality of channels to allow fluid flow longitudinally between the outer conduit 14 and the inner conduit 12. Preferably, six ribs 22 are provided approximately sixty degrees apart to provide six channels. However, the invention is not limited by the number of ribs and the invention can be practiced with any desired number of ribs, including no ribs, that will keep the inner conduit properly disposed within the outer conduit and to provide adequate flow characteristics between the inner and outer conduits.

The dimensions of the inner conduit 12 are such that the inner conduit 12 can be sealingly disposed within the outer conduit 14. For example, the inner and outer diameters of the body 20 may be approximately 0.618 inches (15.697 mm) and 0.700 inches (17.78 mm), respectively. The ribs 22 may extend radially outward approximately 0.080 inches (2.032 mm) from the body 20. Thus, the outer diameter of the inner conduit 12 with the ribs 22 may be slightly larger than approximately 0.860 inches (21.844 mm). The inner conduit 12 is preferably made of a relatively flexible material, such as rubber, thermoplastics, thermosets, or the like.

The outer conduit 14 extends longitudinally and is adapted to be disposed over the inner conduit 12. The outer conduit 14 is hollow and has a generally circular cross-sectional shape. The outer conduit 14 includes an end fitting, shown generally at 23, with a first end portion 24 and a second end portion 26. Both the first and second end portions 24, 26 are generally circular in cross-sectional shape. The first end portion 24 has an inner diameter slightly smaller than the second end portion 26 such that the inner conduit 12 is sealingly disposed within the first end portion 24. For example, the first end portion 24 may have an inner diameter of approximately 1.000 inches (25.4 mm), whereas the second end portion 26 may have an inner diameter of approximately 1.060 inches (26.924 mm). The second end portion 26 includes a recess 28 for receiving a sealing element 30, such as an O-ring, or the like for sealing the fluid splitter body 18 in the assembled conduit assembly. A shoulder 32 separates the first end portion 24 from the second end portion 26. The shoulder 32 acts as a stop for the fluid splitter body 18 during assembly of the conduit assembly 10. The outer conduit 14 is made of a relatively rigid material, such as a metal material, or the like.

The fluid splitter nipple 16 is generally cylindrical in shape and has a cavity or passageway 34 extending from one end 36 to an opposite end 38 for allowing the heated fluid from the pump 116 to pass therethrough. One end of the fluid splitter nipple 16 includes an inner conduit receiving portion 40 having an outer diameter similar to the inner diameter of the body 20 of the inner conduit 12 such that the flexible inner conduit 12 can be sealingly disposed over the inner conduit receiving portion 40. For example, the outer diameter of the inner conduit receiving portion 40 may be approximately 0.620 inches (15.75 mm) and the inner diameter of the body 20 may be approximately 0.618 inches (15.697 mm). The inner conduit receiving portion 40 may include one or more recesses 42 forming a serrated pattern for assisting in gripping and sealing the inner conduit 12. The inner conduit receiving portion 40 include a plurality of ribs 44 extending radially outward approximately 0.266 inches (6.75 mm) from an outer surface 46 of the inner conduit receiving portion 40. The plurality of ribs 44 acts as a stop for the inner conduit 12 when the inner conduit 12 is disposed over the inner conduit receiving portion 40 during assembly. In addition, the plurality of ribs 44 acts as a stop for the outer conduit 14 when the outer conduit 14 is disposed over the inner conduit 12 during assembly. Further, the ribs 44 locate and center the fluid splitter body 18 relative to the fluid splitter nipple 16 such that the fluid splitter nipple 16 is generally concentric with respect to the fluid splitter body 18 when the conduit assembly 10 is assembled.

The fluid splitter nipple 16 also includes a fluid splitter body receiving portion 48 having a relatively smaller outer diameter portion 50, a relatively larger outer diameter portion 52 and a step or ledge 54 therebetween. The smaller outer diameter portion 50 includes a raised bead 56 extending radially outward for connecting the smaller outer diameter portion 50, depending on which end of the inner and outer conduits 12, 14 the conduit assembly 10 is attached, to an outlet (not shown) of the pump 116 or to the intake (not shown) of the heater core 134. In the illustrated embodiment, the bead 56 has an outer diameter that is approximately equal to the outer diameter of the larger outer diameter portion 52. The larger outer diameter portion 52 includes a recess 58 for receiving a sealing element 60, such as an O-ring, or the like for sealing the fluid splitter body 18 in the assembled conduit assembly. A raised lip 62 separates the fluid splitter body receiving portion 48 from the inner conduit receiving portion 40. The raised lip 62 also acts as a stop when the fluid splitter body 18 is disposed over the fluid splitter nipple 16 during assembly.

The fluid splitter body 18 is generally cylindrical in shape and has a cavity 64 extending longitudinally therethrough. One end of the cavity 64 of the fluid splitter body 18 has an opening 66 having a diameter slightly larger than the outer diameter of the larger diameter portion 48 of the fluid splitter nipple 16 for allowing the larger diameter portion 52 of the fluid splitter nipple 16 to pass therethrough. The other end of the cavity 64 of the fluid splitter body 18 includes a radially enlarged opening 68 capable of receiving the end fitting 23 of the outer conduit 14. The fluid splitter body 18 has an outer surface 72 with a relatively larger outer diameter than an outer surface 74 at the end proximate to the opening 68. The outer surface 72 may include a beveled surface 76 at the end proximate to the opening 66. As mentioned earlier, the shoulder 32 of the end fitting 23 of the outer conduit 14 acts as a stop for the fluid splitter body 18 when the fluid splitter body 18 is slipped over the end fitting 23 during assembly of the conduit assembly 10.

The fluid splitter body 18 also includes a passageway 70 extending radially inward from the relatively larger diameter outer surface 72 of the fluid splitter body 18 and into the cavity 64 for fluid communication therewith. The passageway 70 enables the relatively cooler return fluid flowing through the outer conduit 18 from the heater core 134 to be in fluid communication with the pump 116.

Figure 2:
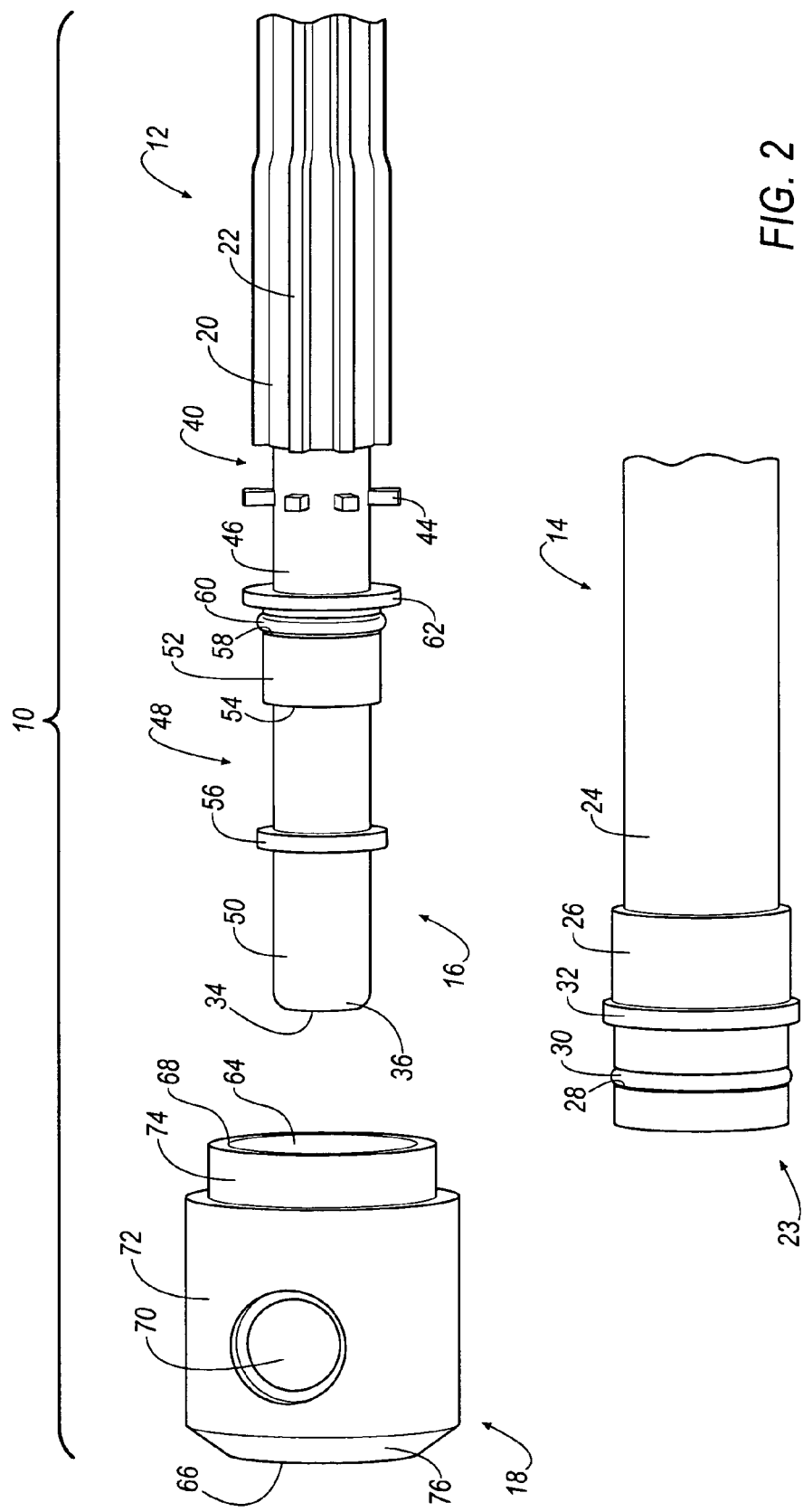
FIG. 2 is a side view of the conduit assembly when the inner conduit is assembled over one end of a fluid splitter nipple in accordance with the invention.
Figure 3:
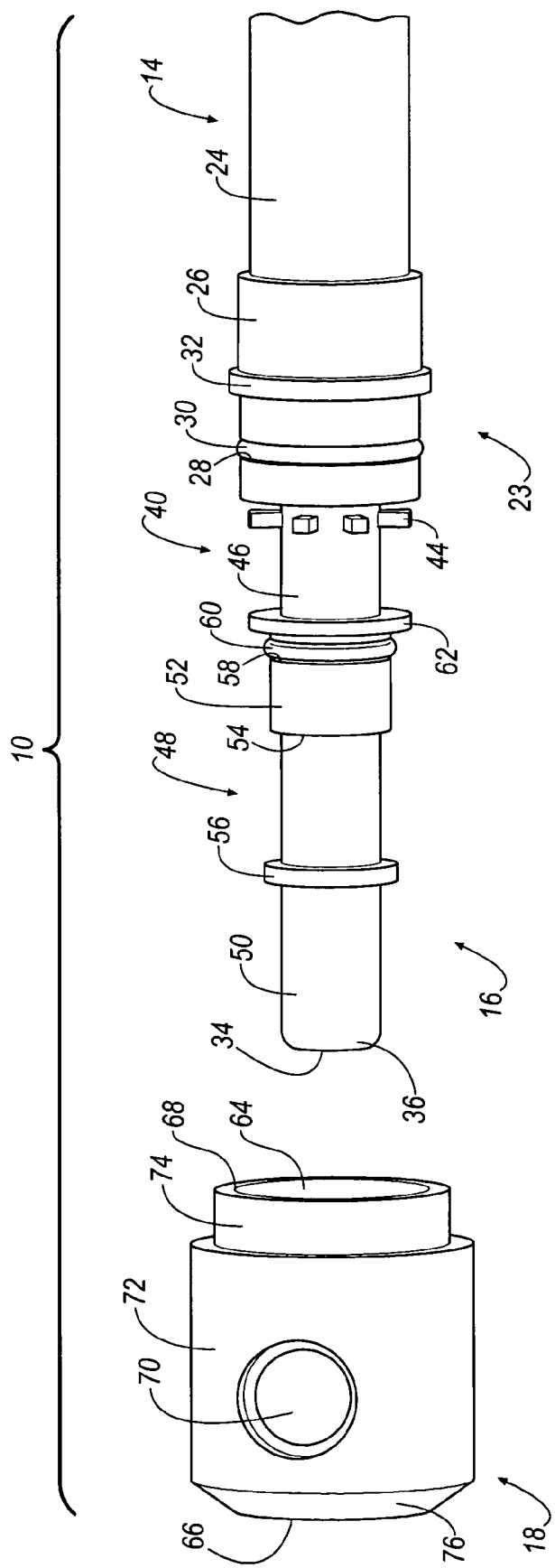
FIG. 3 is a side view of the conduit assembly when the outer conduit is assembled over the inner conduit in accordance with the invention.
Figure 4:
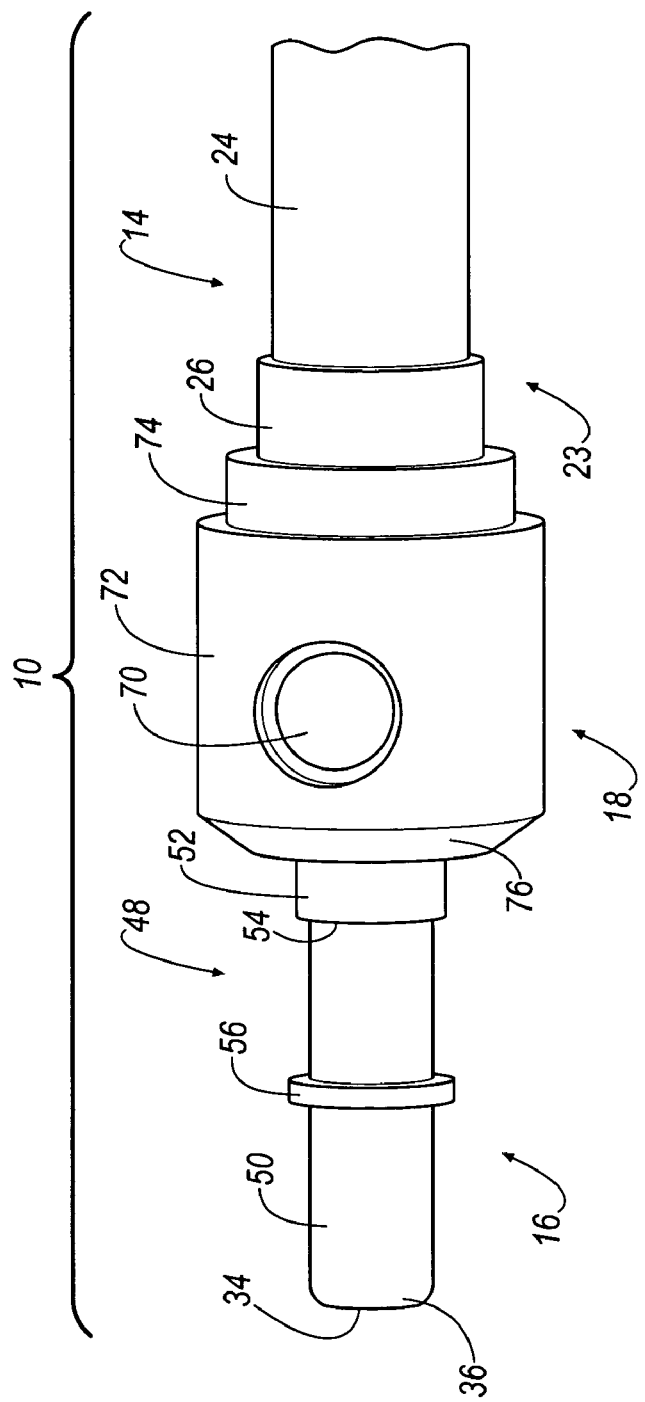
FIG. 4 is a side view of the conduit assembly when the fluid splitter body is assembled over the other end of the fluid splitter nipple to completely assemble the conduit assembly in accordance with the invention.

To assemble the conduit assembly 10 of the invention, one end of the inner conduit 12 is disposed over the inner conduit receiving portion 40 of the fluid splitter nipple 16, as shown in FIG. 2. The recesses 42 formed in the outer surface 46 of the inner conduit receiving portion 40 assist in gripping and sealing the inner conduit 12 when disposed over the inner conduit receiving portion 40. Although not shown in FIG. 2, the inner conduit 12 can be disposed over the inner conduit receiving portion 40 until the inner conduit 12 abuts the ribs 44 of the fluid splitter nipple 16. Next, the outer conduit 14 is disposed over the inner conduit 12 until the second end portion 26 of the outer conduit 14 abuts the ribs 44 of the fluid splitter nipple 16, as shown in FIG. 3. It should be appreciated that the outer conduit 14 can be disposed over the inner conduit 12 prior to the inner conduit 12 being disposed over the inner conduit receiving portion 40 of the fluid splitter nipple 16. Then, the fluid splitter body 18 is disposed over the fluid splitter nipple 16 until the end of the fluid splitter body 18 abuts the lip 62 of the fluid splitter nipple 16, as shown in FIG. 4. At this point, the fluid splitter body 18 is sealed by the sealing elements 30, 60 of the outer conduit 14 and the fluid splitter nipple 16, respectively. Once the fluid splitter body 18 is disposed over the inner and outer conduits 12, 14, the fluid splitter nipple 16 and the fluid splitter body 18 can be attached so as to be in fluid communication with either the pump 116 or the heater core 134.

In operation, the fluid splitter nipple 16 that attaches the conduit assembly 10 to the pump 116 directs the heated fluid from the pump 116 into the inner conduit 12 for transferring the heated fluid from the pump 116 to the heater core 134. The fluid splitter body 18 attached to the pump 116 also directs the relatively cooler fluid transferred from the outer conduit 14 back to the pump 116 through the passageway 70.

Conversely, the fluid splitter nipple 16 that attaches the conduit assembly 10 to the heater core 134 directs the heated fluid transferred from the pump 116 and the inner conduit 12 to the heater core 134. The fluid splitter body 18 attached to the heater core 134 also directs the relatively cooler fluid from the heater core 134 into the outer conduit 14 for transfer back to the pump 116 for another cycle. Thus, the relatively warmer fluid passing through the inner conduit 12 is exposed to the temperature of the fluid passing simultaneously through the outer conduit 14, rather than being exposed to the ambient environmental conditions as in conventional heater assemblies, thereby improving the thermal efficiency of the fluid transfer system.

Figure 5:
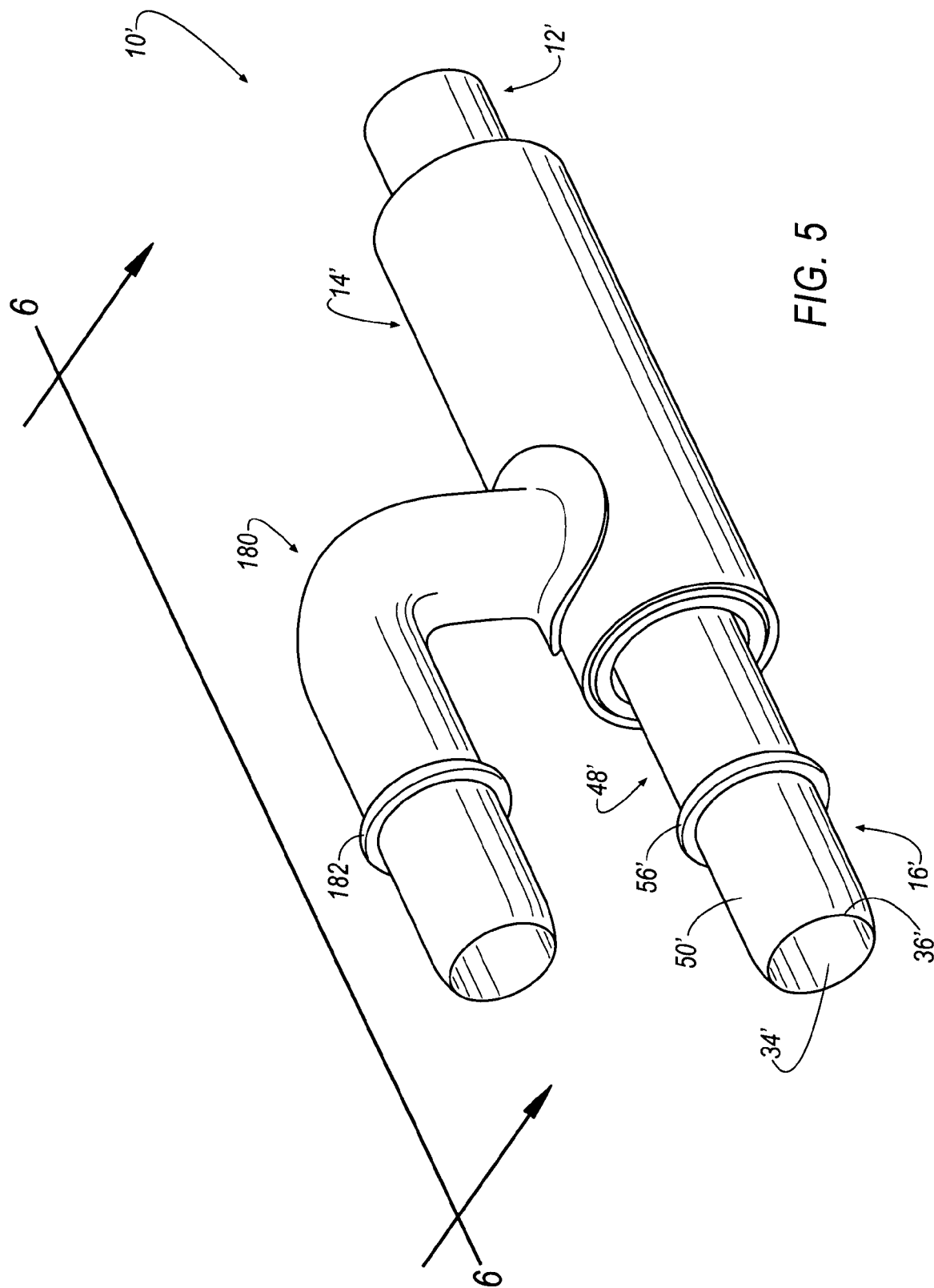
FIG. 5 is a perspective view of a conduit assembly for transferring fluid showing the various components according to another embodiment of the invention.
Figure 6:
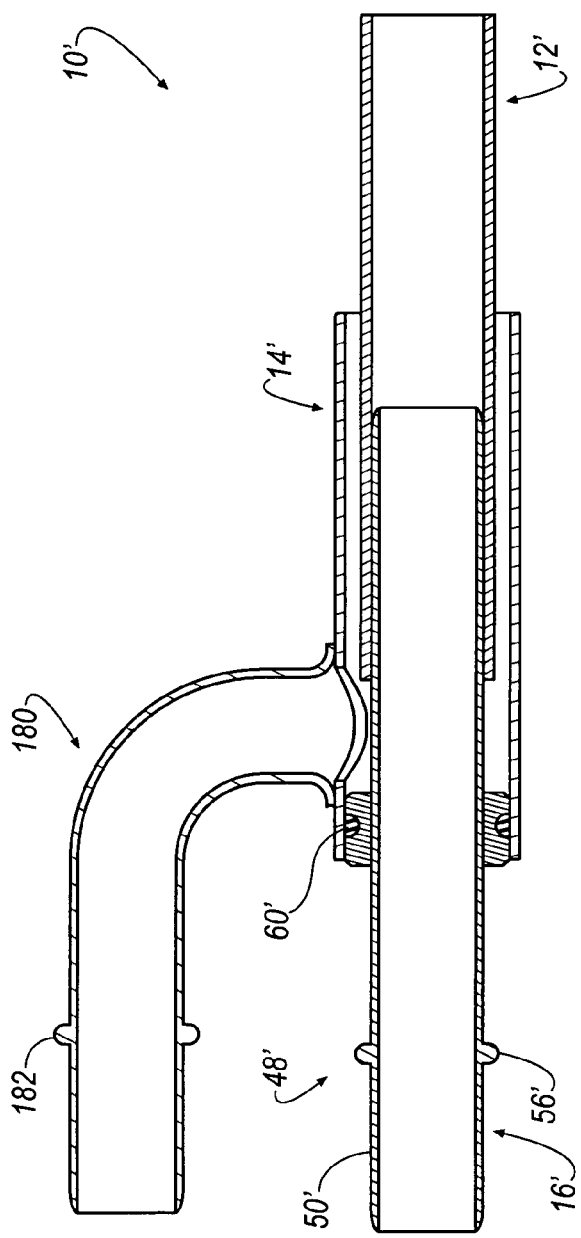
FIG. 6 is a cross-sectional view of the conduit assembly taken along line 6—6 of FIG. 5.
Figure 7:
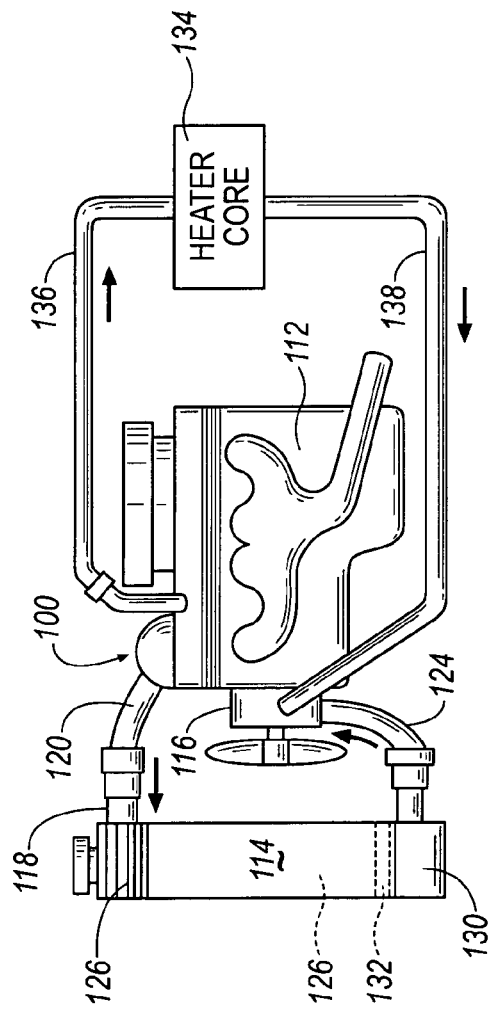
FIG. 7 is a schematic view of a conventional heater system in combination with an internal combustion engine and subsystems in which two heater hoses are required to transfer fluid to and from the heater core.

Referring now to FIGS. 5 and 6, a conduit assembly 10' is shown according to another embodiment of the invention. The conduit assembly 10' includes an inner conduit 12', an outer conduit 14', and a fluid splitter nipple. In this embodiment, the inner conduit 12' and the fluid splitter nipple 16' may be substantially identical to the inner conduit 12 and the fluid splitter nipple 16 of the earlier embodiment of the invention, except that the fluid splitter nipple 16' may be of substantially uniform diameter along its length. In addition, the outer conduit 14' is attached to the fluid splitter nipple 16' by crimping one end of the outer conduit 14'. A sealing member 60', such as an O-ring, or the like, can be used to provide a seal between the outer conduit 14' and the fluid splitter nipple 16'.

In addition, a connecting member 180 is attached to the outer conduit 14' by brazing, welding, or the like, to form a "saddle joint" type of connection with the outer conduit 14'. The connecting member 180 may include a raised bead 182, similar to the raised bead 56' on the fluid splitter nipple 16', for connecting the conduit assembly 10' to the intake (not shown) of the heater core 134. As shown in FIGS. 5 and 6, the conduit assembly 10' is simpler in construction as compared to the conduit assembly 10 of the earlier embodiment of the invention because the fluid splitter body 18 is not needed.

It should be understood that the aforementioned and other various alternatives to the embodiments of the invention described herein may be employed in practicing the invention. For example, the principles of the invention can be practiced with other types of conduits that contain a fluid, such as a power steering hose, a clutch hose, or the like. It is intended that the following claims define the scope of the invention and that the method and apparatus within the scope of these claims and their equivalents be covered thereby.

What is claimed is:

1. A conduit assembly for fluid transfer in combination with a pump and a heater core, comprising:
   an inner conduit for transferring a first fluid, said first fluid being transferred from the pump to the heater core of a heater system;
   an outer conduit disposed around said inner conduit for transferring a second fluid, and
   a fluid splitter body capable of receiving a portion of said outer conduit,
   wherein the first fluid passing through said inner conduit is exposed to a temperature of the second fluid and shielded from ambient environmental conditions by passing through said outer conduit; and
   whereby said fluid splitter body selectively has the first fluid flow in a first direction and the second fluid flow in a second direction, the first and second fluids flowing through said fluid splitter body.

2. The assembly according to claim 1, further including a fluid splitter nipple sealingly engaging said inner conduit.

3. The assembly according to claim 1, further including a connecting member attached to said outer conduit forming a saddle joint type of connection with said outer conduit.

4. The assembly according to claim 1, wherein the first fluid has a higher temperature than the second fluid.

5. The assembly according to claim 1, wherein said inner conduit includes a plurality of ribs for concentrically positioning said inner conduit within said outer conduit.

6. The assembly according to claim 1, wherein said fluid splitter nipple includes a plurality of ribs for concentrically positioning said fluid splitter nipple within said fluid splitter body.

7. The assembly according to claim 1, wherein the second fluid is transferred from a heater core to a heat reservoir and then back to a pump of a heater system.

8. The assembly according to claim 1, wherein said inner conduit is made of a flexible material.

9. The assembly according to claim 1, wherein said outer conduit is made of a rigid material.

10. A method of assembling a conduit assembly between a pump and a heater core including an inner conduit, an outer conduit, a fluid splitter nipple, and a fluid splitter body, the method comprising the steps of:
    disposing the inner conduit over the fluid splitter nipple;
    disposing the outer conduit over the inner conduit; and
    disposing the fluid splitter body over the fluid splitter nipple,
    whereby a first fluid passing through the inner conduit is exposed to a temperature of a second fluid passing through the outer conduit and shielded from ambient environmental conditions; and
    whereby the fluid splitter body selectively has the first fluid flow in a first direction and the second fluid flow in a second direction, the first and second fluids flowing through the fluid splitter body.

11. The method according to claim 10, further comprising the step of disposing a fluid splitter body over a portion of the outer conduit to form a seal between the fluid splitter body and the outer conduit.

12. The method according to claim 10, further comprising the step of attaching a connecting member to the outer conduit to form a saddle type of connection between the connecting member and the outer conduit.

* * * * *